United States Patent [19]

Halemba et al.

[11] Patent Number: 4,972,877
[45] Date of Patent: Nov. 27, 1990

[54] BYPASS VALVE

[75] Inventors: Peter Halemba, Russell; George S. Ellis, III, Chardon; David W. Crozier, Highland Heights, all of Ohio

[73] Assignee: Kinetico, Inc., Newbury, Ohio

[21] Appl. No.: 426,491

[22] Filed: Oct. 23, 1989

Related U.S. Application Data

[63] Continuation of Ser. No. 308,890, Feb. 9, 1989, abandoned.

[51] Int. Cl.$^5$ .......................................... F16K 11/085
[52] U.S. Cl. .......................... 137/625.29; 137/625.43; 137/270
[58] Field of Search .................... 137/625.43, 625.29, 137/270

[56] References Cited

U.S. PATENT DOCUMENTS

| | | |
|---|---|---|
| Re. 30,224 | 3/1980 | Ortega . |
| 825,706 | 7/1906 | Dyblie . |
| 925,692 | 6/1909 | Gold . |
| 1,166,571 | 1/1916 | Bard . |
| 2,344,714 | 3/1944 | Martin . |
| 2,532,003 | 11/1950 | Wyer . |
| 2,907,349 | 10/1959 | White . |
| 3,115,160 | 12/1963 | Rogers . |
| 3,191,628 | 6/1965 | Kirkwood et al. . |
| 3,194,267 | 7/1965 | Lyon et al. . |
| 3,307,583 | 3/1967 | Harter . |
| 3,339,583 | 9/1967 | Fleckenstein et al. .......... 137/625.29 |
| 3,476,151 | 11/1969 | Hegstad ........................ 137/625.29 |
| 3,669,148 | 6/1972 | Burkhalter, Jr. . |
| 3,938,553 | 2/1976 | Ortega . |
| 3,973,592 | 8/1976 | Cleaver et al. ................ 137/625.43 |
| 4,313,428 | 2/1982 | Goldenberg . |
| 4,318,424 | 3/1982 | Bajka . |
| 4,385,746 | 5/1983 | Tomlin et al. . |
| 4,470,429 | 9/1984 | Johnson ........................ 137/270 |
| 4,506,703 | 3/1985 | Baron . |
| 4,520,847 | 6/1985 | Baron ............................ 137/625.43 |
| 4,543,996 | 10/1985 | Baron . |
| 4,601,307 | 7/1986 | Johnson . |

Primary Examiner—Arnold Rosenthal
Attorney, Agent, or Firm—Watts, Hoffmann, Fisher & Heinke Co.

[57] ABSTRACT

A bypass/diverter valve for controlling the flow of fluid from a source to a fluid treatment device such as a water softener. The valve includes a valve housing defining a circular chamber having a cylindrical wall into which three spaced ports open into. Two of the ports form inlet/outlet ports communicating with connecting conduits. The third port forms an intermediate port that communicates with the input to the water softener. The valve housing also defines a second intermediate port communicating with the output of the water softener and which communicates with the valve chamber through a passage arrangement. A plug-like valving member is rotatable within the chamber and includes a recess which together with the chamber wall defines a passage for selectively communicating one of said inlet/outlet ports with said first intermediate port while concurrently communicating said other inlet/outlet port with the second intermediate port or alternately for communicating said first inlet/outlet port with said second intermediate port while concurrently communicating the second inlet/outlet port with said first intermediate port. The valving member is also positionable to block flow out of either of said inlet/outlet ports. The plug member includes a recess for communicating fluid from the passage to one of the inlet/outlet ports when the valving member is rotated to a predetermined position. A movement control disc delimits the extremes of movement in the valving member and is positionable in two different positions to change the extremes of movement.

20 Claims, 5 Drawing Sheets

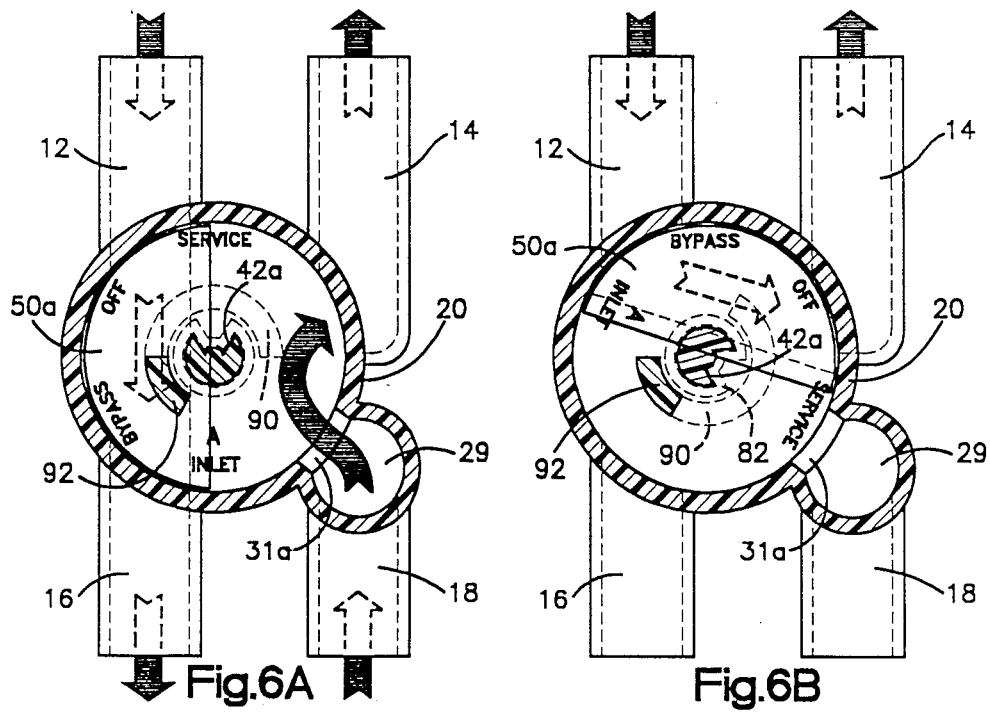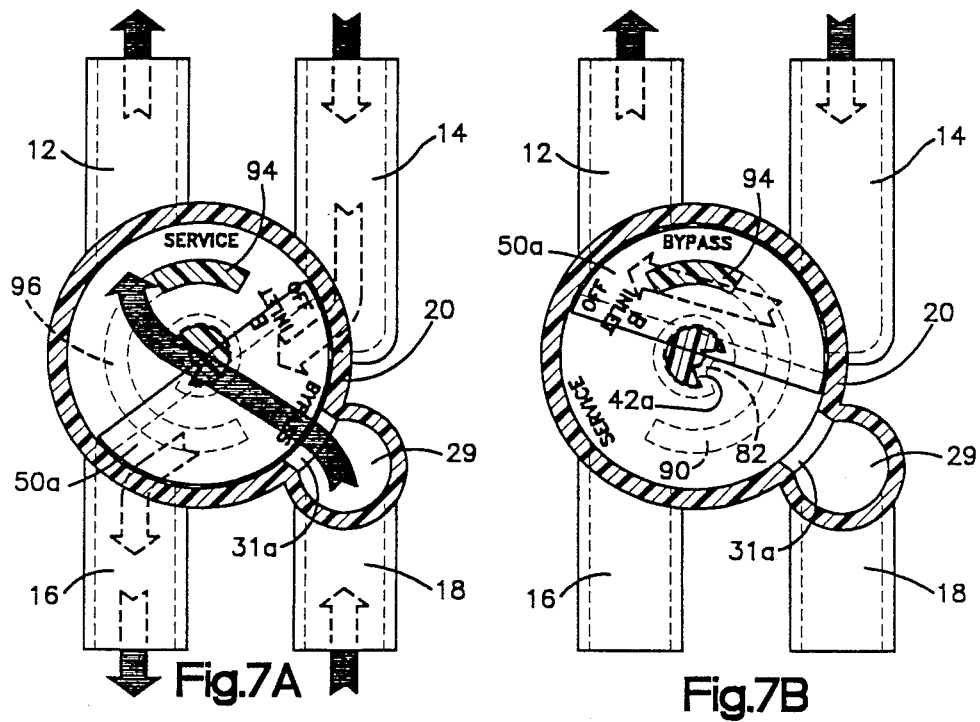

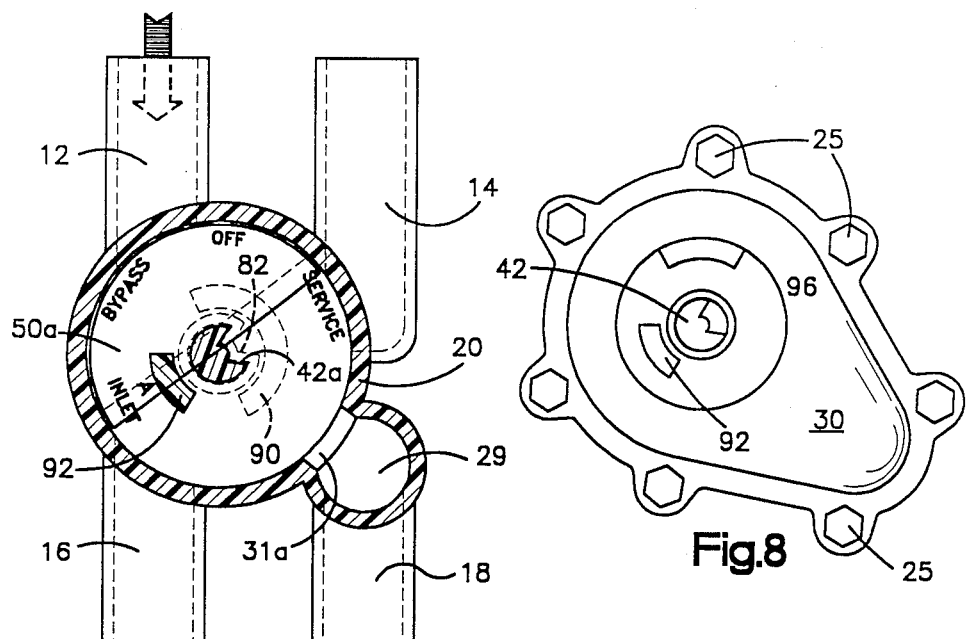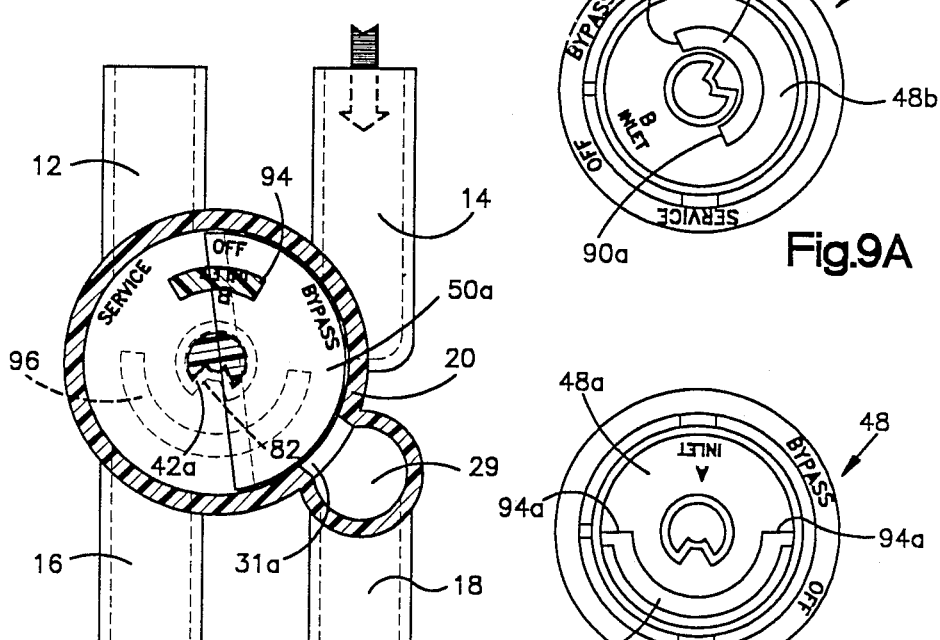

BYPASS VALVE

TECHNICAL FIELD

This application is a continuation of application Ser. No. 308,890, filed Feb. 9, 1989, now abandoned.

The present invention relates generally to fluid control valves and in particular to a by-pass or diverter valve.

BACKGROUND ART

By-pass valves also termed diverter valves are often used in plumbing systems to control the communication of fluid to a plumbing fixture or fluid processing device. For example, in the case of a water softener, it has been known to use a valving assembly to control the communication of source water to the water softener as well as provide a diversion path for the incoming water so that the water supply to the household is not interrupted during service of the water softener.

Known prior devices have been complex and/or expensive. Some have included multiple valves, manifolds and complex conduits in order to achieve the desired control.

Another problem associated with the installation of a plumbing fixture or fluid treatment device that includes an inlet and an outlet, such as a water softener or hot water tank, is a mismatch that often occurs between the inlet and outlet of the device and the source and the water supply pipes forming part of the plumbing system. In instances where household plumbing connections do not match the plumbing fixture connections, installers are required to devise awkward, cross-over connections in order to couple the household plumbing to the fixture. In instances where the fixture is being installed in a limited space, the installation can be extremely difficult and expensive.

DISCLOSURE OF THE INVENTION

The present invention provides a new and improved by-pass or diverter valve that not only controls the communication of fluid to a plumbing fixture or other fluid treatment device also provides conduit structure for providing connections to the fluid or plumbing system that are adaptable to the position and location of the source and supply conduits of the system.

The present invention will be described in connection with a water treatment system and in particular, a water softener system which is normally serially connected in a fluid stream so that under normal operating conditions source water to be treated enters an inlet to the water softener and is discharged through an outlet of the water softener for delivery to a water supply. It should be understood that the present invention is adaptable to fluid systems in general in which a fluid device must occasionally be isolated from an inlet fluid stream.

In the preferred and illustrated embodiment, the valve includes a housing defining four ports and a valving member for selectively communicating the ports in predetermined configurations. The housing defines a fluid chamber into which all of the ports communicate. The valving member is moveable within the chamber, to several predetermined positions and defines a flow passage segment. When the valving member is moved to predetermined positions the passage cross communicates certain of the four ports in predetermined configurations depending on the selected position.

According to a preferred embodiment of the invention, the valving chamber is circular in configuration and includes a circular wall having a predetermined axial extent. In accordance with this embodiment, the valving member includes a plug-like portion that is rotatably supported in the valving chamber.

In the preferred and illustrated embodiment, three of the four ports communicate directly into valving chamber and are spaced apart. Preferably these chamber ports are located equidistant apart, i.e., substantially 120° apart. In accordance with this embodiment, two of the three chamber ports function as inlet/outlet ports for the valve and are connected to a source line through which fluid to be treated is delivered to the control valve and a supply line to which treated fluid leaving the control valve is discharged. The third port is connected to the inlet to the fluid treatment device.

When the disclosed valve is used to control the communication of water to a water softener, one of the inlet/outlet ports is connected to the source of hard water while the other inlet/outlet port is connected to the household plumbing system. The third port would be connected to the inlet of the water softener.

The plug portion of the valving member defines the passage segment which is sized to span the distance between adjacent ports so that at predetermined rotative positions of the valving member two adjacent ports of the three chamber ports can be directly intercommunicated by the passage segment. The passage is also sized such that when the valving member is rotated to either one of two intermediate positions the passage communicates with only one of the two inlet/outlet ports and in effect surrounds the inlet/port and blocks fluid flow out of the port covered or enclosed by the passage.

According to the preferred embodiment of the invention, the fourth port opens into a secondary chamber which in turn communicates with the valving chamber. In the disclosed construction, the fourth port communicates with the outlet of the fluid treatment device, i.e. water softener. The plug portion of the valving member preferably defines two segments. One segment forms the cross communicating passage for communicating two adjacent ports of the three chamber ports. The other segment provides a flow path from the secondary chamber to either one of the two inlet/outlet ports depending on the rotative position of the valving member.

With the disclosed invention, the two inlet/outlet ports define changeable inlet and outlet ports either of which can serve as an inlet and be connected to the source line. Preferably, the combination inlet/outlet ports are located in an adjacent relationship and are intercommunicated by the passage segment defined by the valving member when the valving member is placed in a "bypass" position.

When the valving member is rotated to a "service" position, the passage segment communicates the inlet/outlet port connected to the source line with the water softener inlet port. At the same time, the device outlet port (which communicates with the secondary chamber) is communicated with the other inlet/outlet port via the second plug segment.

According to a feature of the invention the valving member is positionable, during valve installation in one of two operational configurations. According to this feature, the installed position of the valving member determines which of the inlet/outlet ports will function as the actual inlet (and be connected to the source) and which will function as the outlet (and be connected to the house supply). With the present invention, the valve can be adapted to the existing plumbing so that complex and/or contorted connections are not necessary to connect the household plumbing to the control valve. In the preferred construction, conduits associated with the inlet/outlet ports extend from the valve housing and are connectable to the household plumbing, preferably using removable threaded connections or compression fittings.

In the preferred arrangement, structure formed on the housing cooperates with a movement controller and determines the extent of movement of the valving member and in particular establishes:

(1) the "bypass" position of the valving member at which the inlet is communicated directly to the outlet and flow to the water softener is bypassed.: and, (2) the "service" position of the valving member at which fluid from the source is allowed to proceed to the water softener and flow from the water softener is communicated to the household supply. An "off position, at which flow out of the inlet port (which is connected to the source) is blocked, is located intermediate the "bypass" and "service" positions. In the disclosed embodiment, the valve housing includes a removable cap by which access to the valve chamber is achieved. The cap is installed after the valving member is positioned in the chamber. The valving member includes an operating stem that extends from the plug portion and through an aperture in the cap. The stem is adapted to receive an operating handle by which the valving member is rotated to one of the three operating positions: "bypass", "service" or "off".

According to this embodiment, the movement controller is mounted on the valving member stem intermediate the cap and handle. The cap includes stops which cooperate with the movement controller and restrict movement in the valving member to predetermine limits.

According to a feature of this embodiment, the valving member is placed in one of two operating positions during installation and once the controller and handle have been attached, the valve operating configuration is establish. In particular, the initial position of the valving member determines which of the inlet/outlet ports will function as the inlet and which will function as the outlet. The configuration is easily changed by repositioning the valving member and reinstalling the movement controller and the handle. The controller preferably includes indicia for indicating which position the valving member is in.

According to another feature of the invention, the passage segment includes a peripheral seal which seals the passage to the wall of the chamber. As a result, when the passage is positioned over a single port, that port is isolated from the rest of the chamber and hence the other ports. In this position, the valve member blocks flow to and out of the port it overlaps. With this feature, the valve member can be placed in the "off" position to completely isolate the household supply from the source line. In other words, the disclosed valve can also serve as a water "shut-off" valve when service to the plumbing system, downstream from the water treatment device, is needed.

Additional features of the invention will become apparent and a full understanding obtained by reading the following detailed description made in connection with the accompanying drawings.

BRIEF DESCRIPTION OF DRAWINGS

FIGS. 6A-6C schematically illustrate the fluid flow paths through the valve for various rotative positions of the valving member when the valve is in one operating mode;

FIGS. 7A-7C schematically illustrate the fluid flow paths through the valve for various rotative positions of the valving member when the valve is in another operating mode;

FIG. 8 is a top plan view of a chamber cap forming part of the by-pass valve; and, FIGS. 9A and 9B are elevational views of opposite sides of a movement control disc forming part of the by-pass valve.

BEST MODE FOR CARRYING OUT THE INVENTION

Figure 1:
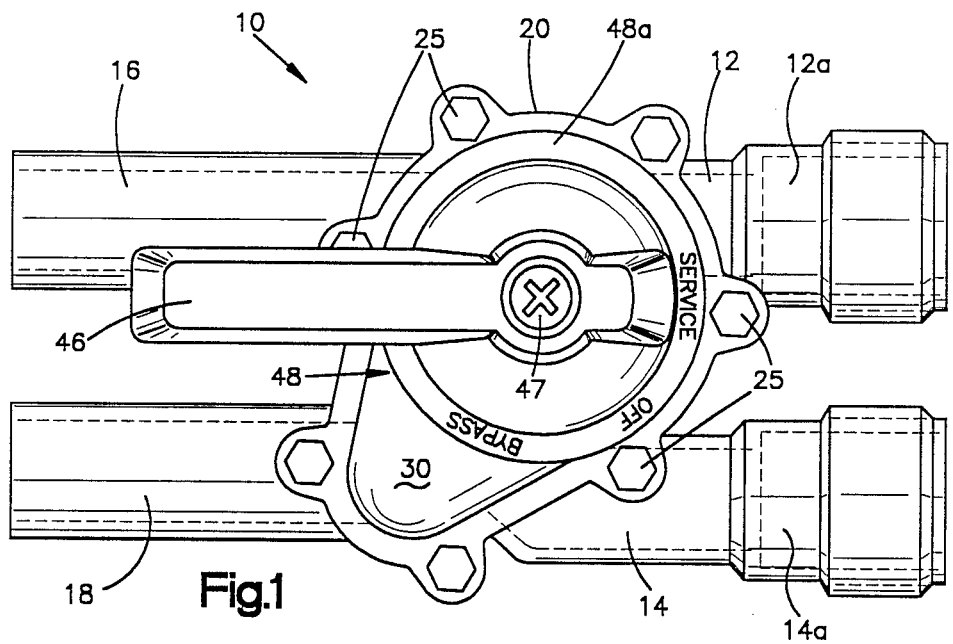
FIG. 1 is a top plan view of a by-pass/diverter valve constructed in accordance with the preferred embodiment of the invention.
Figure 2:
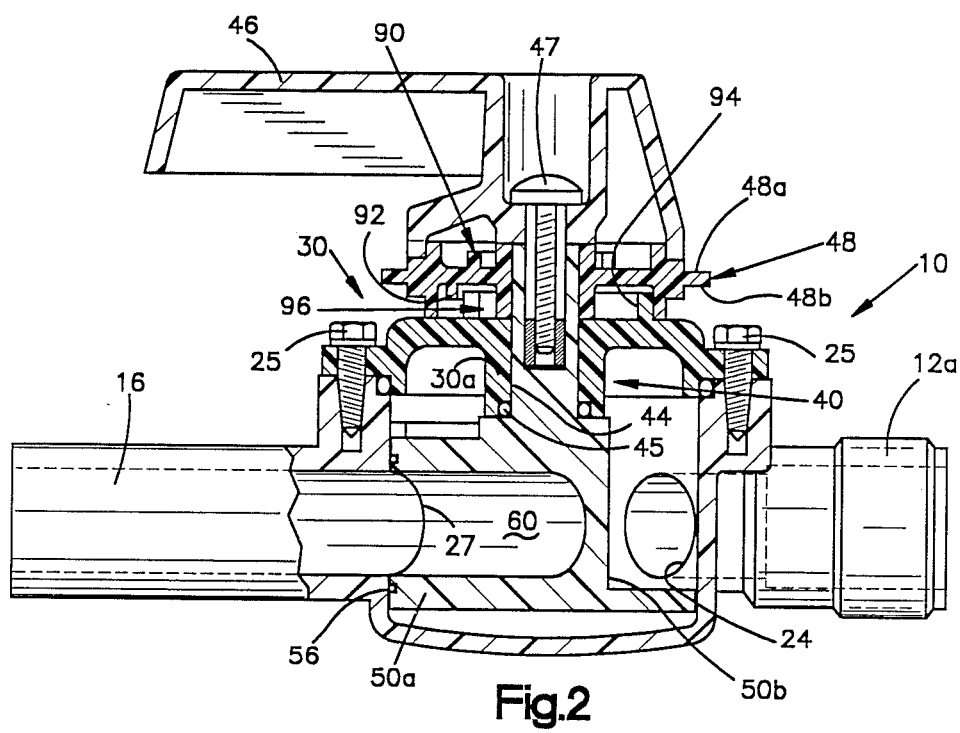
FIG. 2 is a partial sectional view of the valve shown in FIG. 1.
Figure 3:
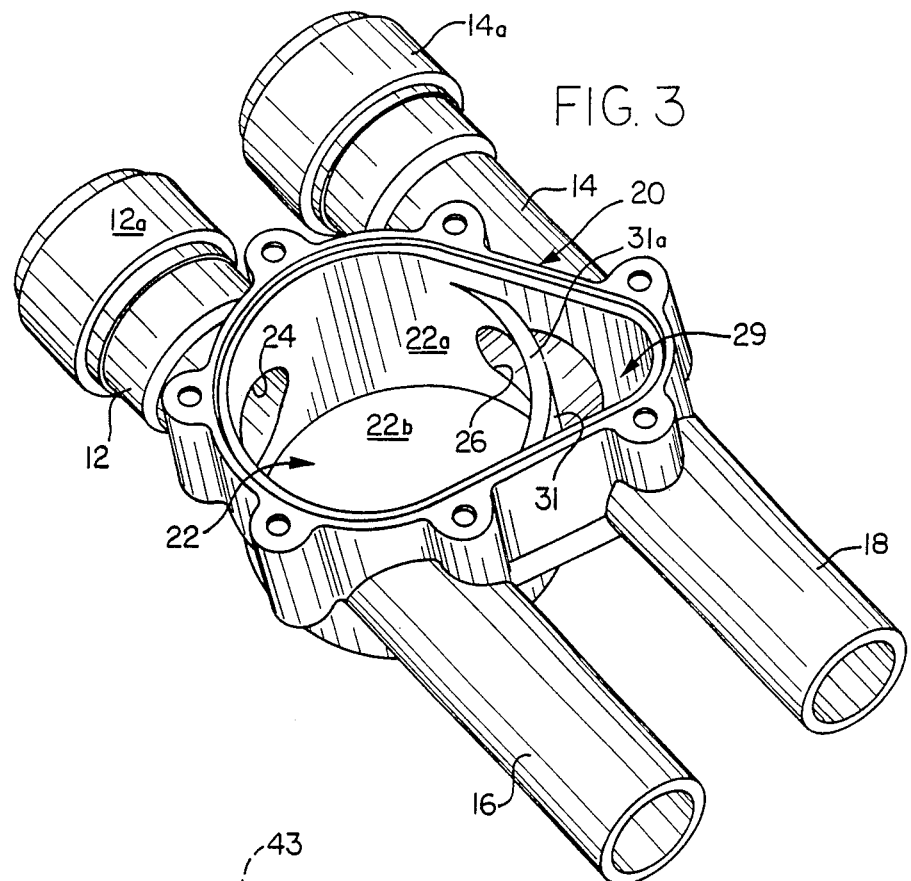
FIG. 3 is a perspective view of a portion of a valve housing forming part of the valve shown in FIG. 1.

Referring to FIGS. 1 and 2, the overall construction of a by-pass/diverter valve constructed in accordance with the preferred embodiment of the invention is illustrated. As seen best in FIG. 1, the valve includes a valve housing indicated generally by the reference character 10. Four short conduits 12, 14, 16, 18 extend from a valve chamber section 20 of the housing 10. In the preferred and illustrated embodiment, the conduits and valve chamber section, as seen best in FIG. 3, are integrally molded as a unitary member. One or more of the conduits may include threaded or compression fittings 12a, 14a for removably connecting the conduits to fluid supply/receiving lines (not shown).

Each of the conduits communicate directly or indirectly with an internal valve chamber (shown best in FIG. 3) through an associated port. The valve chamber 22 is defined at least partially by a uniform circular wall 22a having a predetermined axial extent and a base or end wall 22b that closes off one radial side of the axial wall. The other radial side of the chamber 22 is closed off by a removable chamber cap 30. The cap 30 is held in position by a plurality of threaded fasteners 25. In FIG. 3, ports 24, 26 are illustrated which communicate the conduits 12, 14, respectively with the chamber 22. The conduit 16 also communicates directly with the valve chamber 22 through an associated port 27 (shown partially in FIG. 2). As seen in the figures, the ports 24, 26, 27 extend through the circular wall 22a.

Figure 4:
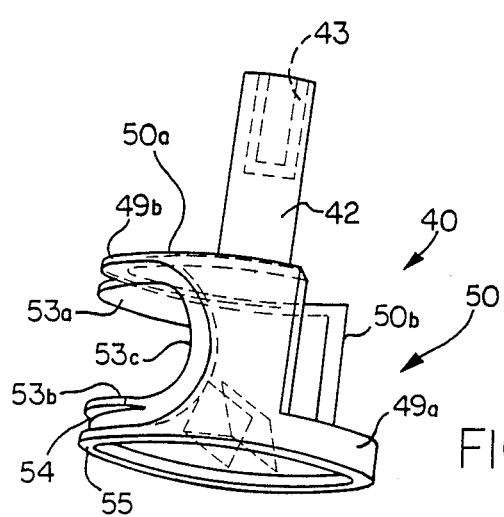
FIG. 4 is a perspective view of a valving member forming part of the valve shown in FIG. 1.
Figure 5:
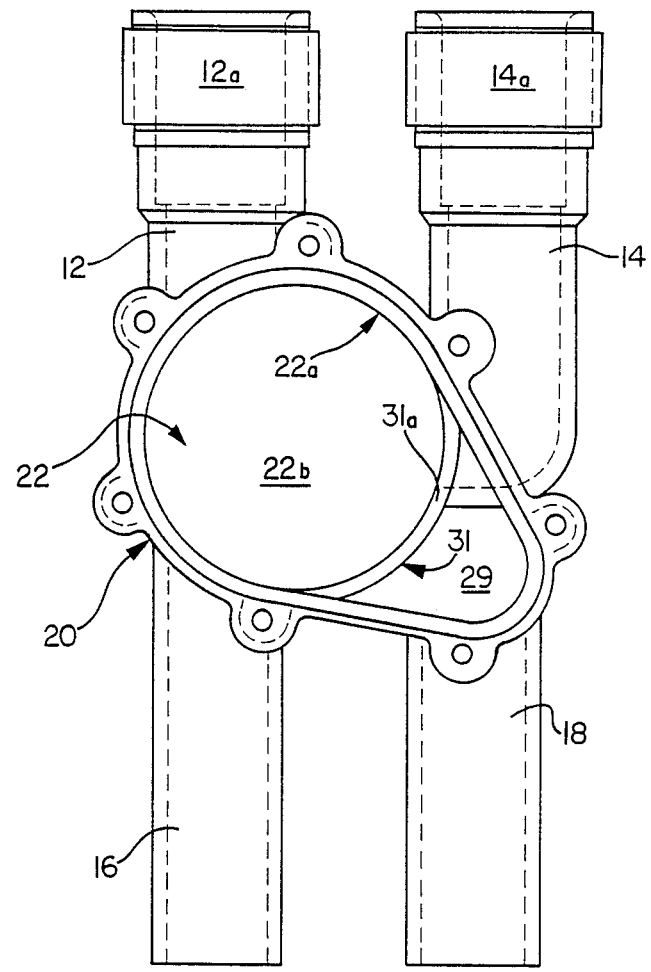
FIG. 5 is an elevational view of the housing shown in FIG. 3.

The conduit 18, however, as seen best in FIGS. 3 and 5, communicates with a passage-like transfer chamber 29. The transfer chamber 29 communicates with the main valve chamber 22 by way of a clearance gap 31a formed in a wall segment 31 forming part of the chamber wall 22a. The wall segment is preferably integrally molded with the housing 10. The gap defines a clearance space between the wall segment 31 and the chamber cap 30 when the valve is assembled. Referring to FIGS. 2 and 4, a valving member 40 for controlling the fluid communication between the various ports, and the associated conduits is rotatably supported within the valve chamber 22.

The valving member 40 (as seen best in FIG. 4) includes a stem 42 that extends upwardly (as viewed in FIG. 2) through a bore 44 formed in the cap 30. An O-ring seal 45 inhibits fluid leakage between the stem 42 and the cap 30. The axial position of the valving member 40 within the housing is maintained by a tubular, downwardly depending standoff 30a formed in the cap 30. A handle 46 is operatively connected to the stem by a fastener 47 which is threaded into an axial bore 43 formed at the top of the stem 42. A rotation controller in the form of a disc 48 is located between the handle 46 and the chamber cap 30 and as will be explained later, controls the extent of rotation of the valving member 40.

Referring again to FIG. 4, the valving member 40 includes a plug-like lower portion 50 including an annular base surface 55 which rides atop at least a portion of the end wall 22b forming the bottom of the valve chamber 22. Extending upwardly (as viewed in FIG. 4) from the base surface 55 is a cylindrical segment 49a that at least partially supports the plug portion 50 for rotation in the valve chamber 22 and in particular confronts the cylindrical wall 22a of the chamber 22. A semi-circular, cylindrical rotation support surface 49b is defined near the top of the plug portion 50. The plug portion 50 includes a passage section 50a and a relieved section 50b. The axial extent of the passage section 50a is substantially equal to the axial extent of the wall segment 31. With this construction, fluid leaving the transfer chamber 29 can flow over the plug portion 50.

The passage section 50a of the plug portion 50 defines a recess which in radial cross section is semicircular in shape. In particular the recess is defined by a pair of spaced apart, substantially planar walls 53a, 53b interconnected by an arcuate wall 53c. Preferably, the midpoint D of the arc of the wall 53c lies substantially on a diametral line of the plug portion 50 (shown in FIG. 6A). An arcuate, oval shaped groove 54 which is adapted to receive an O-ring 56 (shown in FIG. 2) surrounds the recess. The transverse portions of the groove 54 (as viewed in FIG. 4) are formed in the cylindrical support segments 49a, 49b. The O-ring 56 sealingly engages the cylindrical wall 22a of the main valve chamber 22. When the valving member 40 is positioned in the chamber 22, a passage 60 is defined between the recess in the plug member and the portion of the main chamber wall 22a engaged by the O-ring 56. In operation, the passage 60 is isolated from the remainder of the main valve chamber by the O-ring 56.

At predetermined rotative positions of the valve member 40, the passage 60 cross communicates certain ports associated with the conduits 12, 14, 16, 18. By rotating the valving member 40, the cross communication can be changed.

Referring in particular FIGS. 6A–6C, the communication achieved by various positions of the valving member are illustrated for one mode of operation. In FIG. 6A, the valving member 40 is rotated to the "service" position where the passage 60 defined by the valving member overlaps the ports 24, 27. With the valving member in this position, the conduits 12, 16 are intercommunicated and fluid flows from the inlet conduit 12 to the water softener conduit 16. Concurrently, the conduit 18 communicates with the conduit 14 via the transfer chamber 29, clearance gap 31a, and the main chamber portion exposed by the relieved section 50b of the plug portion 50. The main chamber portion exposed in this position includes the section of the cylindrical wall 22a that defines the port 27. In this configuration, the conduit 12 would be connected to the incoming water supply. The household supply would be connected to the conduit 14 which as seen in FIG. 6A communicates with the conduit 18 that is connected to the outlet of the water softener (not shown).

If the water softener requires repair, cleaning, maintenance, etc., the valving member 40 is rotated clockwise to the "bypass" position shown in FIG. 6B. In this position, the passage 60 defined by the plug member communicates the inlet/outlet port 24 (associated with the inlet/outlet conduit 12) with the inlet/outlet port 26 (associated with the outlet conduit 14) thereby directly conveying the incoming water to the port 26. In this configuration, the incoming water is piped directly from the conduit 12 to the conduit 14. In this position, the water softener or other water treatment device is totally isolated from the fluid supply.

According to the invention, movement of the plug member to an intermediate or "off" position (shown in FIG. 6C) serves to totally disconnect the incoming source fluid (communicated through the conduit 12) from both the fluid treatment device and the household supply. In other words, the disclosed by-pass valve will also function as a shut-off valve for the water supply in a residential environment.

Referring to FIGS. 7A–7C, the disclosed control valve includes a feature by which it can be adapted to alternately positioned supply lines. When the valve is configured as shown in FIGS. 6A–6C, the incoming source line would be on the left (as viewed in FIGS. 6A–6C) whereas the connection to the household supply would be on the right. By repositioning the valving member 40, the disclosed control valve can be configured to connect to a source line located on the right and a household supply line located on the left. In particular, the valve can be configured such that the inlet/outlet conduit 14 can be connected to the source and the inlet/outlet conduit 12 can be connected to the supply.

When the valving member 40 is rotated to the alternate "service" position shown in FIG. 7A, the passage 60 defined by the plug portion 50 cross communicates the port 26 associated with the inlet/outlet conduit 14 with the port 27 associated with the device inlet conduit 16. Fluid communication is established between the device outlet conduit 18 and the inlet/outlet conduit 12 by way of the transfer chamber 29 and clearance gap 31a in the wall segment 31 (which together communicate fluid from the conduit 18 to the valve chamber 22). The fluid flows over a top surface of the plug member 50 and enters the port 24 associated with the inlet/outlet conduit 12 which is exposed by the relieved section 50b of the valving member 40. When the water softener is to be isolated from the source and supply lines without interrupting flow between the conduits 12 and 14, the valving member 40 is rotated counterclockwise to the "bypass" position shown in 7B which causes the passage 60 in the plug member 50 cross communicate the ports 24, 26, and hence the conduits 12, 14. When flow is to be terminated, the valving member 40 is rotated to the alternate intermediate "off" position shown in FIG. 7C which blocks flow out of the port 26 and hence from the conduit 14.

The rotation limits of the plug member in either mode of operation are established by the movement control disc 48 located between the operating handle 46 and the cap 30. In the preferred and illustrated embodiment, the control disc 48 is rotatably coupled to the stem 42 by a keyed arrangement which allows the disc to be installed onto the stem 42 in either of two ways. The keyed arrangement comprises a slot 42a formed in the stem 42 which is adapted to receive a key 82 forming part of the disc 48. Referring to FIG. 2, the disc 48 can be installed with either a surface 48a (designated "A" in FIGS. 6A–6C) or a surface 48b (designated "B" in FIGS. 7A–7C) facing upwardly. In position "A", (shown in FIGS. 6A–6B) a raised wall-like segment 90 formed on the surface 48a of the disc 48 is aligned with a raised lug or stop 92 forming part of the cap 30 (shown best in FIG. 8). End surfaces 90a of the wall segment 90 (shown best in FIG. 9A) form abutments for the stop 92. The arcuate extent of the wall segment 90 determines the limits of rotation for the valving member 40.

Referring to FIGS. 6A, 6B the "service" and "by-pass" positions are established at the opposite extremes of movement of the valving member 40. When the fluid flow from source line is to be terminated, the valving member is rotated to the intermediate position i.e., to the position where the indicia "off" is located at the 12 o'clock position as viewed in FIG. 6C. With the control disc 48 positioned as shown in FIGS. 6A–6B, the conduit 12 serves as the inlet conduit whereas the conduit 14 serves as the outlet conduit. It should be noted that in either valve configuration, the conduits 16, 18 remain as the inlet and outlet to the fluid device. As a result, the disclosed valve can be permanently attached to the device without compromising the ability to switch the functions of the inlet/outlet conduits 12, 14.

To switch the functions of the conduits 12, 14, the movement control disc 48 is removed from the stem 42 (by first removing the handle 46) to enable the valving member 40 to be rotated to either of the alternate positions shown in FIGS. 7A, 7B or any intermediate position between these two positions. The control disc 48 is then reversed to position the "B" surface 48b upwardly and reinstalled so that a second raised lug 94 (shown best in FIG. 8) formed on the cap 30 is aligned with an associated raised wall-like segment 96 forming part of the control disc 48. The alternate segment 96 is formed on the disc surface 48a and includes end surfaces 96a that form abutments for the lug 94. After installation, rotation of the valving member is limited by the arcuate extent of the segment 96. As indicated above, when in this position, the conduit 14 serves as the inlet conduit whereas the conduit 12 serves as the outlet conduit.

In the disclosed and preferred embodiment, the "by-pass" position of the valving member 40 is the same in both modes of operation. This feature further facilitates the ability to switch the functions of the conduits 12, 14. According to this embodiment, the bypass valve is switched between its operating modes by first rotating the valving member 40 to the "by-pass" position. With the valving member 40 in this position, the handle 46 and movement controller disc 48 are removed. The disc 48 is then flipped and the handle 46 reinstalled. Using this method of switching valve functions does not require that the valving member 40 be repositioned prior to installing the controller disc 48.

With the disclosed invention, a very useful but inexpensive by-pass/diverter valve is provided which enables fluid flow to a fluid treatment device such as a water softener, to be diverted directly to an outlet conduit when service on the water softener is needed. In addition, the by-pass valve includes a shut-off position at which fluid flow from the inlet is totally isolated from both the fluid device and the rest of the household supply. Moreover, by repositioning the valving member 40 within the valve chamber 22, the function of the inlet/outlet conduits can be changed to facilitate installation of the water softener.

Although the invention has been described with a certain degree of particularity, it should be understood that those skilled in the art can make various changes to it without departing from the spirit or scope of the invention as hereinafter claimed.

What is claimed is:

1. A control valve, comprising:
  (a) a housing defining a valve chamber having a substantially uniform cylindrical wall;
  (b) a valving member disposed within said chamber and mounted for rotational movement between predetermined positions;
  (c) a pair of spaced apart, inlet/outlet ports opening into said chamber through said cylindrical wall and at least one intermediate port opening into said chamber;
  (d) means communicating a second intermediate port with said chamber;
  (e) said valving member defining a passage portion, said passage portion being in fluid communication with at least a portion of said cylindrical wall;
  (f) seal means around said passage portion and sealing engaging said cylindrical wall whereby a passage is formed having a predetermined extent and which is fluidly isolated from said valve chamber;
  (g) said predetermined extent of said passage and said inlet/outlet port spacing being arranged such that in one position the passage extends between and fluidly cross communicates said pair of inlet/outlet ports, in another position it communicates one of said inlet/outlet ports with said first intermediate port and in third and fourth positions said passage portion formed in said valve member overlies one of said inlet/outlet ports to fluidly isolate said inlet/outlet port whereby flow out of said inlet/outlet port into said valve chamber is blocked;
  (h) movement control means for limiting movement in said valving member between predetermined positions.

2. The control valve of claim 1 wherein said means for communicating said second intermediate port comprises an auxiliary passage that communicates with said valve chamber and said valving member includes a relieved portion for exposing one of said inlet/outlet ports in order to fluidly communicate said passage with said exposed port.

3. The control valve of claim 1 wherein said movement control means comprises a control disc located outside of said housing and operatively connected with a stem member forming part of said valving member.

4. The apparatus of claim 1 wherein said valving member includes a plug-like portion.

5. The apparatus of claim 1 wherein said means for communicating said second intermediate port comprises a clearance gap defined between a valve housing cap means and said valving member.

6. The apparatus of claim 5 wherein said means for communicating further comprises an opening formed in a wall segment that partially defines said valve chamber.

7. The apparatus of claim 6 wherein said opening is located at a location that is spaced axially with respect to the position of said passage portion defined by said valving member when said valving member is located in its operative position in said valve chamber.

8. A by-pass/diverter valve for controlling the communication of a fluid supply to and from a fluid treatment device, comprising:
 (a) a valve housing including a pair of inlet/outlet connection means for connecting said valve to a fluid source and to an outlet for receiving treated fluid;
 (b) structure defining a control chamber having a cylindrical wall portion and spaced apart, inlet/outlet ports associated with said pair of inlet/outlet connection means, said inlet/outlet ports extending into said control chamber through said cylindrical wall portion;
 (c) structure defining a fluid treatment device input port and a fluid treatment device output port, said fluid device input port extending through said cylindrical wall portion into said control chamber;
 (d) rotatable valve means for fluid communicating either one of said inlet/outlet ports with said fluid treatment device input port while concurrently communicating the other of said inlet/outlet ports with said fluid treatment device output port, said valve means defining a passage portion surrounded by a peripheral seal means sealing engageable with said cylindrical wall portion when said valve means is disposed in said control chamber, said passage portion together with a section of said cylindrical wall portion bounded by said seal means defining an isolated passage;
 (e) said passage having a predetermined extent and said inlet/outlet ports and said fluid treatment device input port having a spacing selected such that in a first rotated position of said valve means, said passage extends between and fluidly communicates said inlet/outlet ports, in a second position said passage extends between and fluidly communicates one of said inlet/outlet ports and said fluid treatment device input port and in third position said passage portion of said valve means overlies one of said inlet/outlet ports and blocks flow out of said one inlet/outlet port.

9. The bypass valve of claim 8 wherein said valve means for communicating includes a plug-like valving member rotatable within said control chamber forming part of said valve housing.

10. The apparatus of claim 9 wherein said valving member is installable in said valve housing in either of two positions and said apparatus further comprises a movement control means for delimiting the extremes of movement of said valving member after said valving member is installed in one of said two positions.

11. The valve of claim 10 wherein said movement control means is positionable in one of two positions, the position of said movement control means establishing a mode of operation for said bypass/diverter valve.

12. The apparatus of claim 11 wherein said movement control means comprises a disk installable on a valving member portion and cooperating with structure formed on said valve housing to delimit a range of rotation of said valving member.

13. The apparatus of claim 12 wherein said movement controlled disk includes at least two control surfaces each including structure engageable by a stop means formed on said valve housing.

14. A control valve, comprising:
 (a) a valve housing defining a circular chamber having a cylindrical wall having a predetermined axial extent;
 (b) at least three, spaced apart fluid ports opening into said chamber through said cylindrical wall;
 (c) a valving member including a plug portion sized to fit within said chamber and rotatable therein;
 (d) said plug portion defining a recess located in a confronting relation to said cylindrical wall when said valve member is installed in said chamber;
 (e) seal means extending around a periphery of said recess and sealingly engaging said cylindrical wall such that said recess and a section of said cylindrical wall bounded by said seal means forms an isolated flow passage that extends across a portion of said valving chamber said fluid ports having a selected spacing and said flow passage having an extent such that first and second adjacent ports of said three ports are cross-communicated at one predetermined position of said valving member and the second and third ports are cross-communicated at another predetermined position of said valving member;
 (f) structure defining a fourth port communicating with a region of said valving chamber through a passage means;
 (g) said plug portion including means for communicating said passage means with selected ports when said valving member is moved to selected positions; and,
 (h) adjustable movement control means for delimiting movement in said valving member to a first range that includes said first predetermined position but not said second predetermined position or a second range that includes said second predetermined position but not said first predetermined position.

15. The apparatus of claim 14 wherein said three ports are spaced substantially 120° apart.

16. The apparatus of claim 15 wherein said ports are transversely aligned with respect to a rotational axis of said valving member.

17. The apparatus of claim 14 wherein said adjustable movement control means forms part of a handle assembly that cooperates with structure formed on said housing.

18. The apparatus of claim 17 wherein said handle assembly comprises a handle and a movement control disc mounted to a stem attached to said valving member, said movement control disc positionable on said stem in one of two positions such that in one position, movement in said valve member is delimited to said first range and in the second position, movement in said valve member is delimited to said second range.

19. The apparatus of claim 14 wherein two of said three spaced apart fluid ports form inlet/outlet ports, one of said inlet/outlet ports communicating with a fluid source, the other of said inlet/outlet ports communicating with a fluid receiving means.

20. The apparatus of claim 19 wherein said means for communicating said passage means comprises a relieved section formed in said plug portion which is arranged to selectively communicate one of said inlet/outlet ports with said fourth port when said valving member is moved to another selected position.

* * * * *